Figure 1:
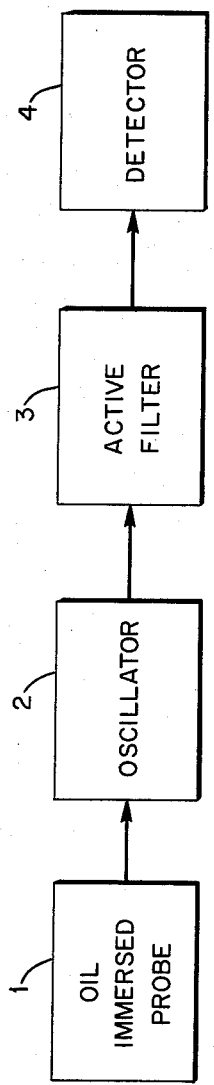

March 1, 1966

J. J. HENRY ETAL 3,238,453

APPARATUS FOR MEASURING THE DIELECTRIC CONSTANT
OF OIL UTILIZING AN ACTIVE FILTER COUPLED TO
A TUNED OSCILLATOR

Filed July 25, 1962

2 Sheets-Sheet 1

INVENTORS.
John J. Henry
Robert W. Johnson
James B. Mankin, Jr.

BY

ATTORNEY.

3,238,453
APPARATUS FOR MEASURING THE DIELECTRIC
CONSTANT OF OIL UTILIZING AN ACTIVE
FILTER COUPLED TO A TUNED OSCILLATOR
John J. Henry, Robert W. Johnson, and James B. Mankin,
Jr., Oak Ridge, Tenn., assignors to the United States of
America as represented by the United States Atomic
Energy Commission
Filed July 25, 1962, Ser. No. 212,494
6 Claims. (Cl. 324—61)

The invention described herein was made in the course of, or under, a contract with the U.S. Atomic Energy Commission.

This invention relates to systems for determining the dielectric constant of a lubricating oil, and more particularly to a method and apparatus for determining the remaining useful life of a lubricating oil by measuring the dielectric constant of the oil.

It is known in the art that the degree of oxidation of an oil is a measure of its relative quality, and a practical gauge of the oxidation of oils is given by the "specific orientation polarization," which is a function of the dielectric constant of the oil. Data collected over the life test of oils indicate that deterioration can be detected by a careful analysis of dielectric constant changes. Since new oil is composed mainly of non-polar compounds, its dielectric constant is approximately equal to the square of its refractive index. The products of oxidation are polar compounds, and they cause the dielectric constant of the oil to increase.

In most oil using equipment, the frequency of oil changes is generally regulated by manufacturer's recommendations based on the number of hours of use, or lapse of time between changes, or distances covered. With a reliable method of determining the remaining useful life of lubricating oils, it is possible to greatly decrease the frequency of oil changes without adversely affecting the equipment. However, portability of the test instrument is important since the various equipments to be tested may be scattered over a large area and the number may be numerous.

In the prior art, it has long been known that the condition of oil was somehow related to dielectric constant, and where a large sample was available, it might be measured by a system employing RF energy. See U.S. Patent 1,960,168, for example. Systems have been devised for indicating changes in dielectric constant, usually in connection with indicating liquid level, as may be seen from U.S. Patents 2,519,668 and 2,280,678. The latter patent employs an oscillator, a tuned circuit, and an amplifier. The tuned circuit is in series with the amplifier and the oscillator is adjusted in accordance with the reactance to be measured to produce a null. However, it may be difficult to determine the exact point where the meter nulls. The techniques of comparing an unknown condenser to a standard is also known. See U.S. Patent 2,599,528. In addition, the incorporation of twin T filters in a feedback circuit to limit the frequency that may be passed is suggested in U.S. Patent 2,383,984.

Although most of the elements and techniques were known in the art, applicants have found a novel way of combining them to produce a new, portable tester which will quickly and easily measure that dielectric constant of small quantities of liquid. This is accomplished through the use of an oscillator tunable to a selected frequency by means of a standard capacitance, subjecting the capacitance to change by immersion in a liquid to be tested, thereby altering the frequency of the oscillator, feeding the signal from the oscillator to an active filter which may take the form of a negative feedback amplifier with a twin T filter in the feedback loop, to provide feedback to reduce the amplified gain for all frequencies except the selected frequency, and then feeding the signal to a detector coupled to the filter to indicate the maximum signal when the oscillator is on the selected frequency.

Applications have as an object of their invention the provision of a portable system for measuring the dielectric constant of a liquid through immersion of a small probe in a liquid bath of minimum quantity.

Applicants have as another object of their invention the provision of a system for measuring the dielectric constant of a hydrocarbon oil employing an indicator that gives a maximum reading without adjustment of the circuits when the liquid under test is in good condition.

Applicants have as another object of their invention the provision of means for measuring the lubricating qualities of oil utilizing changes in oscillator frequency and the effect of such changes on a feedback amplifier to provide a direct visual indication of the condition of an oil sample in terms of dielectric constant.

Applicants have as a further object of their invention the provision of a system for measuring the condition of oil in terms of dielectric constant by utilizing a negative feedback loop in an amplifier for passing a known range of frequencies.

Other objects and advantages of our invention will appear from the following specification and accompanying drawings and the novel features thereof will be pointed out in the annexed claims.

Figure 3:
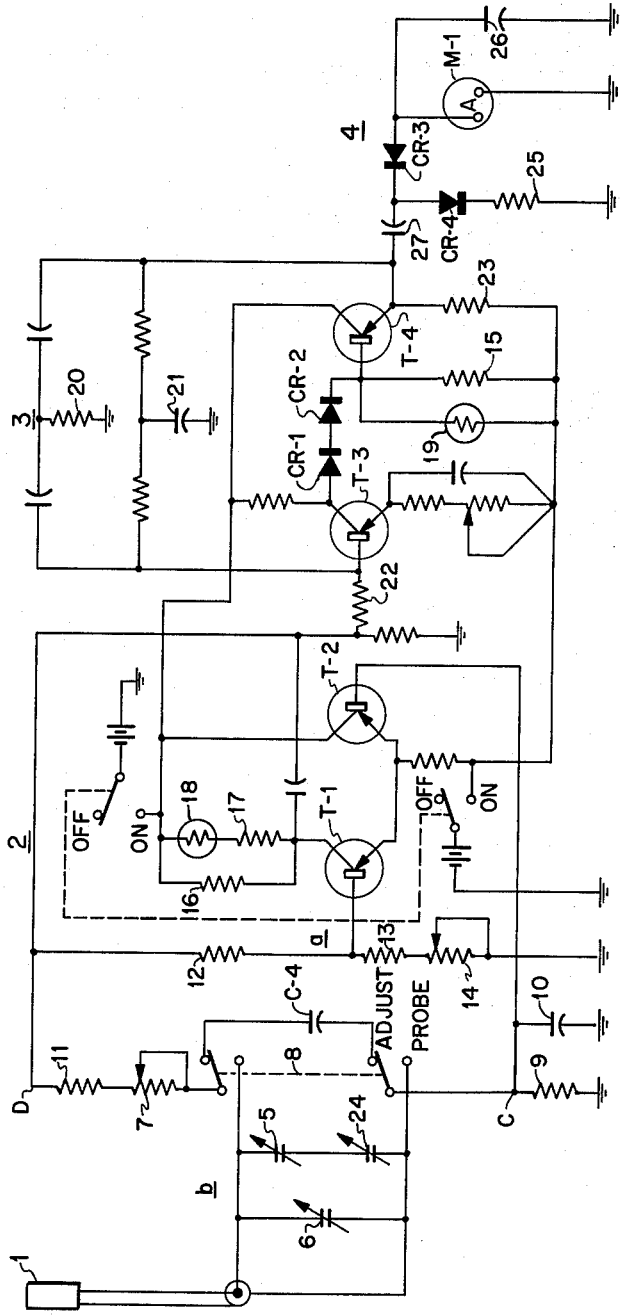
Figure 2:
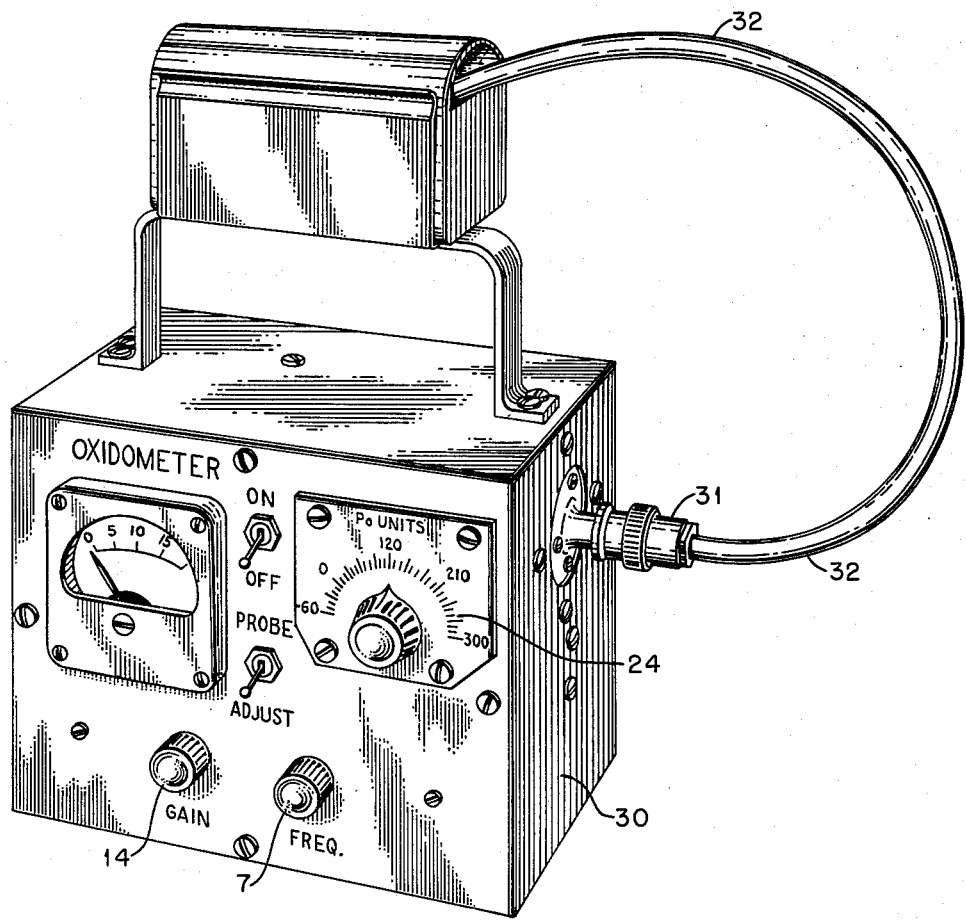

FIG. 1 is a block diagram of our improved system for determining the condition of oil. FIG. 2 is a perspective of our improved oil examining device. FIG. 3 is a schematic of the circuit for our improved system of determining the quality of oil.

Since the degree of oxidation of oils is an index of its quality, the polar index may be represented by the following equation:

$$p_o = p - p_d$$

where $$p = \frac{\epsilon - 1}{\epsilon + 2} \cdot \frac{1}{d}$$

and $$p_d = \frac{\eta d^2 - 1}{\eta d^2 + 2} \cdot \frac{1}{d}$$

The symbols are as follows:

$p_o$ = specific orientation polarization
$p$ = specific polarization
$p_d$ = specific distortion polarization
$\epsilon$ = dielectric constant
$\epsilon i$ = initial dielectric constant
$d$ = density
$\eta d$ = refractive index, sodium $d$ line.

Empirical results based on long-time simulated service tests of oils indicate that:

(1) If $p_o < 0.0100$, there is a large percentage of original life remaining.
(2) If $0.0100 < p_o < 0.0150$, there is a small percentage of the useful life remaining.
(3) If $0.0175 < p_o$, there is a negligible percentage of the useful life remaining.

A satisfactory approximation of $p_o$ for essentially non-polar hydrocarbon oils may be obtained by using a known relationship between density and refractive index. This is given by the following relations:

$$p_o \simeq \frac{\epsilon - \epsilon i}{5.2} \pm 6.5\%$$

The change in dielectric constant, therefore, remains the only variable. Data collected over the life tests of oils indicates that deterioration can be detected by careful analysis of dielectric constant changes.

Since new oil is composed mainly of non-polar compounds, its dielectric constant is approximately equal to the square of its refractive index. The products of oxidation are polar compounds, and they cause the dielectric constant of oil to increase, while the refractive index does not change measurably.

Referring to the drawings in detail, and particularly to the block diagram of FIG. 1 wherein 1 designates an oil immersed probe, 2 an oscillator, 3 an active filter, and 4 a detector, it is seen that the probe may take any convenient form, such as a pair of spaced elongated conductor plates or concentric tubes mounted on an insulated handle or support. The plates or tubes of the probe 1 function as a condenser, and when immersed in oil, the oil serves as a dielectric. Probe 1 is coupled into the input of a sine wave oscillator 2 and when immersed in oil forms a portion of the frequency determining network of the oscillator (as the capacity of the probe changes). The oscillator 2 feeds active filter 3 which may take the form of a negative feed back amplifier with a twin T filter in the feedback loop. The twin T filter acts as a band reject filter tuned to the oscillator 2, so that signals therefrom passing through the amplifier are strongly attenuated in the feedback loop, and this prevents the feedback loop from functioning to reduce the gain of the amplifier. Thus, the oscillator signals are passed by the active filter 3 and reach the detector 4 when the oscillator is operating on the selected frequency. In the detector 4 they produce a maximum deflection of the meter M–1.

However, if the quality of the oil has deteriorated, the dielectric constant thereof will increase. Since the oil provides the dielectric for the condenser probe, an increase in this dielectric constant changes the capacitance of the condenser probe 1. This change in capacitance in turn alters the tuning of the oscillator 2, and signals from the oscillator produced at a different frequency are fed to the active filter 3. If these signals lie outside the reject band of the twin T filter in the feedback circuit, they are passed and applied to the input through the feedback loop in the form of negative feedback. This reduces the amplification of the amplifier of the active filter 3 and in turn, the signal passed on to the detector 4 so that the deflection of the meter M–1 is reduced. To restore the detector 4 to full scale, the oscillator is returned to its normal frequency through manual adjustment of its tuned circuit, and the extent of the manual adjustment is indicated on a dial or indicator. By calibration of this adjustment the change in dielectric constant and hence the deterioration of the oil may be noted.

In FIG. 3, showing one embodiment of a suitable circuit for our system, a cable couples probe 1 into a circuit with variable condensers 6 and 24, 5. Condensers 5 and 6 are padder and trimmer condensers respectively. Condenser 5 is the measuring condenser padder and is used as a calibration adjustment. Trimmer 6 is employed to adjust the probe network for various types of oils. This probe circuit is adapted to be coupled through a ganged double pole-double throw switch 8 to the oscillator input and forms a frequency control network with resistors 7, 9, 11 and condenser 10, and will be referred to as network $b$. The double pole-double throw switch is manually operated and may be employed to connect either a standard condenser C–4 or the probe 1 into the network $b$ that controls the oscillator 2. This network determines the frequency at which point C will be in phase with point D. This is accomplished by the capacitors in the network. At the selected or normal frequency, the phase shift in the series portion of the network including resistors 7, 11, and capacitors 24, 5, 6 and probe 1, is opposite to the parallel portion comprised of resistor 9 and capacitor 10. Voltage divider network $a$, comprised of resistors 12, 13 and 14 coupled to the base of transistor T–1, serves to stabilize the gain. The amplitude of the wave of the sine wave oscillator 2 is controlled by the ratios of the resistors in network $a$.

The oscillator 2 comprised of transistors T–1 and T–2 is preferably a sine wave oscillator although any other suitable type may be used. However, the multivibrator type oscillator has not been found desirable because it is not sensitive to the need for rapid frequency change, and it is difficult to keep the harmonics from the square wave output of the multivibrator from interfering with the measurements. Since the filter network is a band reject filter and not intended to strongly attenuate other frequencies, the harmonics of a multivibrator could limit gain of the amplifier and cause false or less efficient operation of the active filter.

The load resistor 16 (preferably 10K) in the collector circuit of transistor T–1 can be shorted by a circuit including a 10K thermistor 18 and a 24K resistor 17. The resistor 17 is placed in series with the thermistor to reduce the amount of compensation of the oscillator amplifier gain. If omitted, the amplifier gain may drop below the usable point and the oscillator fail to oscillate upon reaching 105° F.

In the preferred oscillator arrangement, two transistors T–1 and T–2 are used so that the inputs thereto are 180° out of phase and produce different amplifier effects. Such an oscillator will respond to the one frequency determined by network $b$.

The output of oscillator 2 is coupled from the collector of transistor T–1 into the base of transistor T–3 of the active filter 3. The active filter 3 is comprised of an amplifier having a stage T–3 coupled to an emitter follower T–4 through series connected diodes CR–1, CR–2 and network 15 shunted by a thermistor 19. The use of a thermistor improves the stability of the CR–1 and CR–2 breakdown, holding them in break down as the result of temperature changes. The series diode arrangement CR–1 and CR–2, when used as a coupling, permits a transfer from 2.6 volt to 6.6 volt (rise in voltage) without signal loss. The voltage across them remains constant.

The amplifier is of the negative feedback type, preferably employing 100% degenerative feedback. The feedback loop contains twin T filters 20, 21 and serves to couple the output of the emitter of transistor T–4 back to the base of the transistor amplifier stage T–3. The twin T filter highly attenuates negative feedback at the selected frequency while offering low attenuation to other frequencies outside the selected band. This leaves the amplifiers T–3, T–4 free to amplify signals of the selected frequency while offering little amplification for other signals passing through the system. The amplifier stage T–3 and emitter follower T–4 combination is employed in order to couple the low D.C. impedance of the feedback network. The emitter follower is thus employed for impedance matching purposes.

To insure proper amplification and match the impedance of the feedback loop, the coupling resistor 22 for the input of transistor T–3 is made large, preferably in the range of 500K to 2½ megs in order to permit the amplifier to operate satisfactorily.

The active filter 3 feeds the detector 4. The coupling is from emitter resistor 23 through a coupling capacitor 27 and a pair of diodes CR–3 and CR–4 to conventional microammeter M–1.

This arrangement is a balanced impedance doubler detector circuit. It doubles the voltages and provides some current. It permits the use of a very low signal lever without saturation, and makes possible a full scale reading on the meter.

Diode CR–4 is connected to ground through resistor 25 and diode CR–3 is coupled to ground through capacitor 26. On a positive signal, diode CR–4 conducts and charges capacitor 27 to peak voltage. On a negative cycle of the sine wave, the charge on condenser 27 and the signal add and are applied through diode CR–3 to the meter M–1. The voltage involved and applied to the meter circuit is double the peak amplitude of the signal voltage.

In the operation of the system, switch 8 is manually operated to connect standard condenser C–4 into the system and remove probe 1 therefrom. Next, the gain is reduced by adjusting resistor 14 until meter M–1 is less than full scale. Then the resistor 7 is adjusted in the frequency network, until the meter M–1 registers a maximum. Then the resistor 14 is adjusted in the gain stabilizing network until meter M–1 is at full scale. At this point the instrument is ready for use. Switch 8 is manually operated again to remove standard condenser C–4 from the system and insert the probe 1. Then with the probe immersed in the oil to be tested, variable condenser 24 is adjusted until the meter reads a maximum. Since the indicator or dial of the condenser 24 is calibrated in "$P_o$" units, the increase in "$P_o$" of the oil under test is obtained from the change in position of the indicator on condenser 24.

As will be noted from FIG. 3, the above system is completely portable, being housed in a small cabinet or box 30 with the meter M–1 indicated in the upper left hand corner, the gain control 14 in the lower left portion, the frequency control 7 in the lower right portion and the variable condenser 24 with its indicator scale in the upper right hand corner. The probe is coupled to the system through the connector 31 and cable 32. The container is the probe and houses the measuring capacitor.

Having thus described our invention, we claims:

1. A system for determining the quality of oil through measurement of changes in dielectric constant comprising a condenser probe for contacting the oil to be tested, a bridge tuned audio frequency oscillator coupled to the probe and responsive to changes in dielectric constant of the oil to alter its frequency, a negative feedback amplifier fed by the oscillator and having a frequency band rejection filter in its feedback loop for passing a signal of a selected frequency and attenuating other frequencies, an indicator fed by the negative feedback amplifier for indicating when the oscillator is operating on said selected frequency, and means for adjusting and measuring the extent of adjustment to restore the oscillator to selected operating frequency.

2. A system for determining the quality of lubricating oil by measuring the dielectric constant comprising a condenser type probe for immersion in the oil to alter its capacitance, an audio frequency oscillator coupled to the probe and responsive to changes in its dielectric constant for altering the normal operating frequency of the oscillator, a negative feedback audio frequency amplifier fed through the oscillator for passing a selected frequency and having twin T filters in its feedback circuit for rejecting signals of said selected frequency from the oscillator, an indicator responsive to signals passed by the amplifier, and manual means for adjusting the frequency of the oscillator to restore it to said selected frequency and for indicating the extent of adjustment.

3. A system for determining the quality of oil by measuring its dielectric constant comprising a condenser probe for insertion into the oil, a sine wave bridge tuned audio frequency oscillator tuned to oscillate at a selected frequency coupled to the probe and responsive to changes in dielectric constant of the oil for altering its frequency of oscillation, a frequency responsive negative feedback amplifier fed by the oscillator for passing a selected frequency and having a frequency responsive network in the feedback loop set to reject the selected frequency of the oscillator, an indicator coupled to the amplifier for indicating the magnitude of signals passed by it, and manual means for adjusting the frequency of the oscillator back to the selected frequency and indicating the extent of the adjustment.

4. A system for determining the quality of oil through measurement of the dielectric constant comprising a condenser probe for immersion in the oil to be tested, a bridge tuned audio frequency oscillator tuned to oscillate at a selected frequency, means for coupling the probe to the oscillator, said means including a gain stabilizing network for adjusting gain and a frequency network for adjusting the frequency of the oscillator, an active filter circuit fed by the oscillator for passing signals of the selected frequency and attenuating other frequencies, a detector coupled to the output of the frequency responsive circuit to indicate the magnitude of the signals passed by it, and means for adjusting the oscillator to the selected frequency and indicating the extent of the adjustment.

5. A device for measuring the dielectric constant of lubricating oils comprising in combination a bridge tuned audio frequency oscillator provided with an output and an input; an amplifier filter provided with a degenerative feedback circuit coupled to said oscillator output, said circuit including a twin T type band pass filter, a detector probe capacitor for immersion in an oil sample and being coupled to said oscillator input; a detector meter coupled to the output of said amplifier for providing a peak reading at the center frequency of said amplifier-filter; and a calibrated variable capacitor coupled to said oscillator for returning said oscillator to said center frequency in accordance with changes in capacitance of said probe capacitor, said calibrated capacitor providing an indication proportional to the specific gravity of said oil sample.

6. A device for measuring the dielectric constant of lubricating oils, comprising in combination an oscillator; a standard capacitor; a circuit including a detector probe capacitor for immersion in an oil sample; means for comparing said standard capacitor with said probe capacitor for providing a difference capacitance measurement therebetween which is a function of the dielectric constant of said oil sample, means for adjusting the capacitances of said probe circuit in accordance with said measurement to restore the frequency output thereof; an active filter coupled to the output of said oscillator, said filter including a direct-coupled amplifier provided with a twin T filter degenerative feedback, said active filter amplifying only a narrow range of frequencies; a detector meter coupled to the output of said active filter, said meter providing a peak reading when said oscillator is tuned to the center frequency of said active filter; and a calibrated variable capacitor coupled to said oscillator for retuning said oscillator to said center frequency when said difference capacitance cause a shift in said center frequency, said calibrated variable capacitor providing an indication of the specific orientation polarization of said oil sample, said polarization being directly proportional to the degree of oxidation of said oil sample.

References Cited by the Examiner

UNITED STATES PATENTS

| | | | |
|---|---|---|---|
| 2,459,046 | 1/1949 | Rieke. | |
| 2,535,027 | 12/1950 | Anderson | 324—61 X |
| 2,934,700 | 4/1960 | Holaday et al. | 324—61 |
| 2,985,826 | 5/1961 | Fluegel | 324—61 |
| 3,017,586 | 1/1962 | Dersch | 333—70 X |
| 3,046,479 | 7/1962 | Mead et al. | 324—61 |
| 3,081,429 | 3/1963 | Moe | 324—61 |

WALTER L. CARLSON, *Primary Examiner.*

C. A. S. HAMRICK, E. E. KUBASIEWICZ,
*Assistant Examiners.*